US011931913B2

(12) United States Patent
Zhang

(10) Patent No.: US 11,931,913 B2
(45) Date of Patent: Mar. 19, 2024

(54) UNIVERSAL FLOORING CUTTER

(71) Applicant: D-CUT PRODUCTS, INC., Oak Brook, IL (US)

(72) Inventor: Charlie Zhang, Oak Brook, IL (US)

(73) Assignee: D-CUT PRODUCTS, INC., Oak Brook, IL (US)

( * ) Notice: Subject to any disclaimer, the term of this patent is extended or adjusted under 35 U.S.C. 154(b) by 236 days.

(21) Appl. No.: 17/502,974

(22) Filed: Oct. 15, 2021

(65) Prior Publication Data

US 2023/0122285 A1 Apr. 20, 2023

(51) Int. Cl.

| | |
|---|---|
| ***B26D 1/08*** | (2006.01) |
| ***B26D 1/00*** | (2006.01) |
| ***B26D 5/10*** | (2006.01) |
| ***B26D 7/01*** | (2006.01) |
| ***B26D 7/26*** | (2006.01) |
| ***F21S 9/02*** | (2006.01) |
| *F21Y 115/10* | (2016.01) |

(52) U.S. Cl.

CPC ............. *B26D 1/08* (2013.01); *B26D 1/0006* (2013.01); *B26D 5/10* (2013.01); *B26D 7/01* (2013.01); *B26D 7/2628* (2013.01); *F21S 9/02* (2013.01); *B26D 2001/002* (2013.01); *F21Y 2115/10* (2016.08)

(58) Field of Classification Search

CPC ........ B26D 1/085; B26D 1/0006; B26D 1/00; B26D 1/08; B26D 5/10; B26D 5/16; B26D 7/2628; B26D 7/26; B26D 7/01; B26D 2001/002; F21V 33/0084; F21Y 2115/10

USPC .................................................... 83/628, 563

See application file for complete search history.

(56) References Cited

U.S. PATENT DOCUMENTS 123,050 A * 1/1872 Alsover .................... B02C 1/14 83/628
2,410,994 A * 11/1946 O'Brien .................. F24H 1/208 261/130
8,448,553 B2 5/2013 Zhang
9,180,600 B2 11/2015 Zhang
10,086,524 B2 10/2018 Zhang
10,434,672 B2 10/2019 Zhang
10,814,510 B2 10/2020 Zhang
2010/0263512 A1* 10/2010 Zhang ...................... B26D 1/08 83/628
2011/0174130 A1 7/2011 Zhang
2011/0197725 A1* 8/2011 Nishimura ................ B26F 1/04 83/13

(Continued)

FOREIGN PATENT DOCUMENTS

FR 2958202 A1 * 10/2011 ............... B26D 3/10

*Primary Examiner* — Nhat Chieu Q Do

(74) *Attorney, Agent, or Firm* — Pauley Erickson & Swanson

(57) ABSTRACT

A cutting tool includes a base with a table surface and a cutting platform. The cutting platform is suspended above the table surface and includes a blade housing. The blade housing includes a blade holder with a linear blade. The blade holder is slidably connected through the base housing. A housing column is configured on the base of the cutting tool. A handle raises and lowers the blade. A guide rail is pivotally connected to the table surface by at least one releasable guide rail connector. The guide rail is releasably locked with respect to the blade at a plurality of angles.

20 Claims, 10 Drawing Sheets

(56) References Cited

U.S. PATENT DOCUMENTS

| | | | | |
|---|---|---|---|---|
| 2011/0226111 | A1* | 9/2011 | Bird | B26D 7/2628 83/640 |
| 2015/0135924 | A1* | 5/2015 | Zhang | B26D 5/16 83/628 |
| 2015/0143969 | A1 | 5/2015 | Zhang | |
| 2015/0151444 | A1 | 6/2015 | Zhang | |
| 2016/0101536 | A1* | 4/2016 | Gundlach | B26D 1/085 83/468 |
| 2016/0144522 | A1 | 5/2016 | Zhang | |
| 2017/0312930 | A1 | 11/2017 | Zhang | |
| 2018/0200913 | A1* | 7/2018 | Zhang | B26D 7/015 |
| 2019/0030747 | A1* | 1/2019 | Zhang | B26D 3/02 |

* cited by examiner

UNIVERSAL FLOORING CUTTER

FIELD OF THE INVENTION

This invention relates generally to a cutting tool and, more particularly, to a cutting tool for cutting building materials, specifically flooring materials.

DESCRIPTION OF PRIOR ART

Users cut building materials, such as those used for flooring options, in a variety of ways to fit in and around a layout of a room or building. Flooring pieces may need to be cut horizontally, vertically, and/or at various angles to properly align the flooring to lit a particular layout. Notches may also need to be cut in flooring pieces to accommodate intricate corners or ledges in a room or building floor layout.

Regardless of the type of installation, all types of flooring options often need to be cut in some capacity to properly install a floor. Common flooring options include carpet, hardwood, laminate, vinyl, tile, engineered hardwood and luxury vinyl tile (LVT) flooring. Different tools of varying cutting strengths are used depending on the type of flooring being installed. As flooring pieces often need to be cut to a variety of sizes at a variety of angles and notches, improved flooring cutters are desired.

SUMMARY OF THE INVENTION

The invention generally relates to a universal cutting tool. The general object of the invention can be attained, at least in part, through a cutting tool that includes a base having a table surface and a cutting platform suspended above the table surface. The cutting platform includes a blade housing. The blade housing includes a blade holder with a linear blade. The blade holder is slidably connected through the blade housing.

The cutting tool also includes a housing column on the base of the cutting tool. The cutting platform is integrated with a portion of the housing column. A handle is included to raise and lower the blade. The handle is rotatably supported by the housing column. A guide rail is pivotally connected to the table surface by at least one releasable guide rail connector. The guide rail is releasably locked with respect to the blade at a plurality of angles. The plurality of angles may include 0°, 45°, and 90°.

The linear blade and blade holder of the cutting tool are slidable within the blade housing in a horizontal direction past an edge of the base. A length of the linear blade is greater than a width of the table surface. A length of the linear blade is greater than a width of the base. A length of the blade holder is greater than a width of the table surface. A length of the blade holder is greater than a width of the base. The linear blade can include tungsten.

The housing column of the cutting tool includes an internal tube. The internal tube is made up of a singular welded piece. The cutting platform can also include a battery-powered light. The handle has an adjustable length. The housing column includes a through-slot at an end of the base of the cutting tool.

A general object of the invention can also be attained through a cutting tool having a base, a table surface, and a linear blade with a length that is greater than a width of the table surface. A cutting platform is suspended above the table surface. The cutting platform includes a blade housing. The blade housing includes a blade holder with the linear blade. The blade holder is slidably connected through the blade housing.

The cutting tool includes a welded housing column on the base of the cutting tool. The cutting platform is integrated with a portion of the housing column. A handle is included to raise and lower the blade. The handle is rotatably supported by the housing column. A guide rail is pivotally connected to the table surface by at least one releasable guide rail connector.

The linear blade and blade holder are slidable within the blade housing in a horizontal direction past a first edge of the base. The linear blade and blade holder are also slidable within the blade housing in a horizontal direction past a second edge of the base.

The blade holder preferably includes a pull on at least one side of the blade holder. The pull slides the blade holder to a selected horizontal position.

Other objects and advantages will be apparent to those skilled in the art from the following detailed description taken in conjunction with the appended claims and drawings.

DETAILED DESCRIPTION OF THE INVENTION

The present invention provides a cutting tool preferably used to cut building materials, particularly flooring materials, such as engineered wood, laminate and LVT flooring. As used herein, "building material" refers to a sheet or plank of building material, such as baseboards, crown molding, chair rail molding, wood flooring, laminate flooring, composite flooring, vinyl flooring, vinyl siding, vinyl composition tile, dimensional lumber or similar materials, including, blit not limited to, one or more combinations of wood, fiber, vinyl, concrete, rubber, plastic and/or other materials that may or may not include a laminated layer.

The cutting tool is preferably capable of cutting building materials at a plurality of angles to a table surface. The cutting tool has a slidable blade particularly useful in making notch cuts at various points on the desired building material. The cutting tool includes a battery-powered LED belt light near the blade to increase precision in making cuts. The cutting tool also includes an adjustable handle for easy operation of the cutting tool as well as convenience for moving and storing the cutting tool.

The cutting tool preferably makes straight cuts both lengthwise and widthwise on materials, as well as notch cuts. The cutting tool of this invention is also capable of cutting building materials at a range of angles in a horizontal plane, with a guide rail set perpendicular to the blade or at a range of angles including 22.5°, 30°, 45° and/or other angles. This horizontal adjustment allows the cutting tool to cut materials, for example, to fit around corners or inlets of various flooring layouts. It should be understood that the cutting tool of this invention is not limited to the listed angular cuts and may be used to cut other angles.

Figure 1:
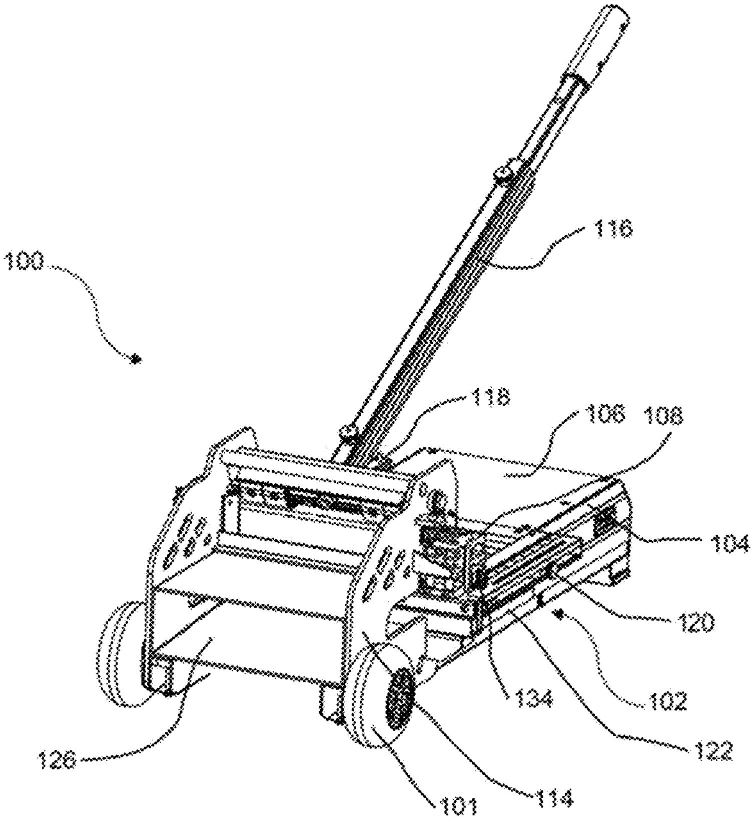
FIG. 1 shows a front perspective view of a cutting tool according to one embodiment of the invention.

FIG. 1 shows a cutting tool 100 that includes a base 102, a table surface 104, a cutting platform 106, a blade housing 108 with a blade holder 110 and a linear blade 112, and a handle 116. The base 102 includes a rectangular base that provides stability for the cutting tool 100, however the base 102 is not limited to this shape and may comprise any shape that provides stable support for the cutting tool 100. The base 102 may be formed of steel, aluminum or another material with durable qualities capable of withstanding the force required to cut the building materials. In this embodiment, the base 102 also includes a plurality of wheels 101 for moving the tool 100.

As shown in FIG. 1, the table surface 104 is connected to at least one of the cutting platform 106 or the base 102 and supports a building material to be cut. The table surface 104 preferably includes a textured or a high friction, non-slip surface that prevents the building material from slipping or moving during the cutting process. The table surface 104 is preferably made of lightweight and durable materials, such as plastic, rubber, metal and/or composite materials, but may be made of any material capable of supporting the building materials and withstanding the cutting force generated by the cutting tool 100.

A piece of building material (preferably flooring) can be placed on the table surface 104 and cut with the linear blade 112 by depressing the handle 116. The cutting platform 106 provides support to the handle 116, linear blade 112 and related components. The cutting platform 106 is supported by a housing column 114. The housing column 114 is connected with respect to the base 102 and is integrated with the cutting platform 106.

A portion of the housing column 114 includes an internal tube 126 at an end of the cutting tool 100. The internal tube 126 is aligned so that a hollow through-pass exists from the table surface 104 through the housing column 114. As such, when the cutting tool 100 is used to cut a piece of flooring material widthwise, the internal tube 126 is sized so that a width of a standard piece of floor material can protrude from the table surface 104, through the Internal tube 126 of the housing column 114. This can be especially desirable when a widthwise cut is needed down a length of a piece of flooring when the length is longer than that of the cutting tool. As shown, the internal tube 126 is rectangular at its surface, including four corners, each corner 90°.

Figure 2:
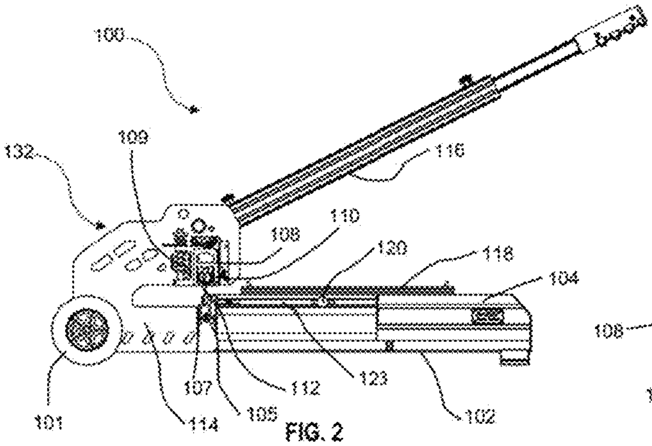
FIG. 2 shows a side view of the cutting tool according to the embodiment shown in FIG. 1.

As shown in FIG. 2, the cutting platform 106 includes a cutting platform base 105, a blade slop 107, and at least one pair of supports 109. The blade stop 105 includes a contact element and a brace. These components of the cutting platform 106 contribute to the movement and stabilization of the linear blade 112 as the handle 116 is moved to make a cut. Such components are discussed in detail in U.S. Pat. No. 10,434,672, herein incorporated by reference.

Figure 3:
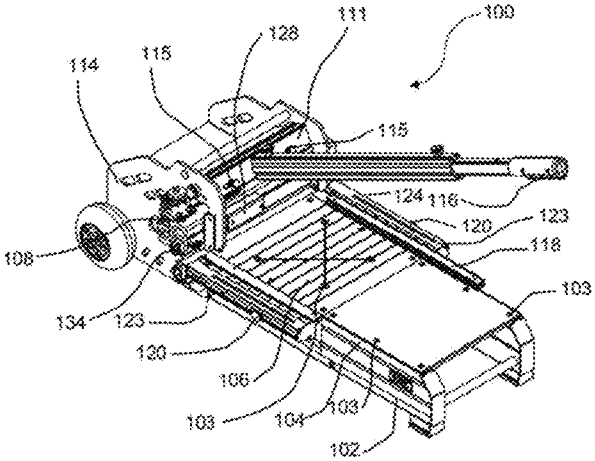
FIG. 3 shows a top perspective view of the cutting tool according to the embodiment shown in FIG. 1.

FIGS. 1-3 show that the cutting tool 100 further includes a guide rail 118 positioned on the table surface 104. The guide rail 118 can be used to align the building material at a range of angles, on a horizontal plane, to the cutting platform 106. The guide rail 118 can be held in place to a desired position across the table surface by a guide rail track 123 in conjunction with a releasable guide rail connector 120. The cutting tool 100 preferably includes a guide rail track 123 and a releasable guide rail connector 120 along at least one portion of a perimeter of the table surface 104.

As shown in FIGS. 1-3, the cutting tool 100 includes a guide rail track 123 and a guide rail connector 120 bordering a first edge 122 and a second edge 124 of the base 102. While FIGS. 1-9 show the guide rail 118 positioned perpendicular to the linear blade 112, the guide rail 118 can be pivoted and held in place at various angles by guiding ends of the guide rail 118 through the guide rail tracks 123. Once a desired position is achieved, the guide rail 118 can be held in place by tightening the releasable guide rail connectors 120 before placing a piece of building material on the table surface 104.

In some embodiments of the invention, the guide rail 118 can also be set in at least one of a plurality of holes 103 that are across the table surface 104 (shown best in FIG. 3). The holes 103 allow the guide rail 118 to be set to a range of angles relative to the blade 112 including, but not limited to, a straight cut, a 90° cut, or a 45° angle. The table surface and/or the guide rail may further include a ruler for measuring the material to be cut.

FIG. 3 also shows a beam 111 extending between the pair(s) of supports 109, and a cam 113 (shown later in FIGS. 5-6) mounted to the beam. The handle 116 is attached to the beam 111 to assist a user to rotate the beam 111 and the cam 113. In one embodiment the beam 111 includes a plurality of connections 115. The plurality of connections 115 allows the handle 116 to be set in at least two positions depending on the desired cut. This allows the handle 116 to rotate fully from an open position to a closed position and to prevent the handle 116 from contacting the base 102 when the handle 116 is depressed to make a cut.

The linear blade 112 of the claimed invention has a length that is longer than a width of the table surface 104. The blade 112 is longer than the distance between the supports 109. As such the blade can also be longer than a width of the base. As shown in FIG. 3, the linear blade 112, blade holder 110 and blade housing 108 extend approximately to the first and second edges 122, 124 of the base, past a width of the table surface 104. The table surface 104 includes a width of 8-10 inches, preferably 9.5 inches, while the linear blade 112 includes a length of 11-14 inches, preferably 13.75 inches. The blade 112 also includes a depth to cut a piece of building material 0.25-1 inches deep, preferably ⅝ inch deep. The blade is also preferably made of tungsten steel, although other suitable materials of related strength may be used.

Having the length of the linear blade 112 longer than the width of the table surface 104 and/or base 102 is particularly useful for when notch cuts are needed in a piece of building material. This is especially necessary when working with flooring materials as notch cuts are often needed when reaching corners in room/building layouts. The blade housing 108 according to embodiments of the invention encases the blade holder 110 so that the blade holder (and therefore the attached linear blade 112) is slidable in a linear direction within the blade housing 108. As such, by sliding the blade holder 110 and blade 112 in a linear direction, only a portion of the blade 112 may remain across the table surface 104 under the cutting platform 106, which allows for simple maneuvering of a flooring piece to make a notch cut with the cutting tool 100. The blade 112 can slide in either direction across the cutting tool to a desired position. Because of the strength of the welded housing column 114, the blade 112 is still able to accurately make a clean cut in a piece of material even if a portion of the blade 112 is no longer positioned over the table surface 104.

Figure 4:
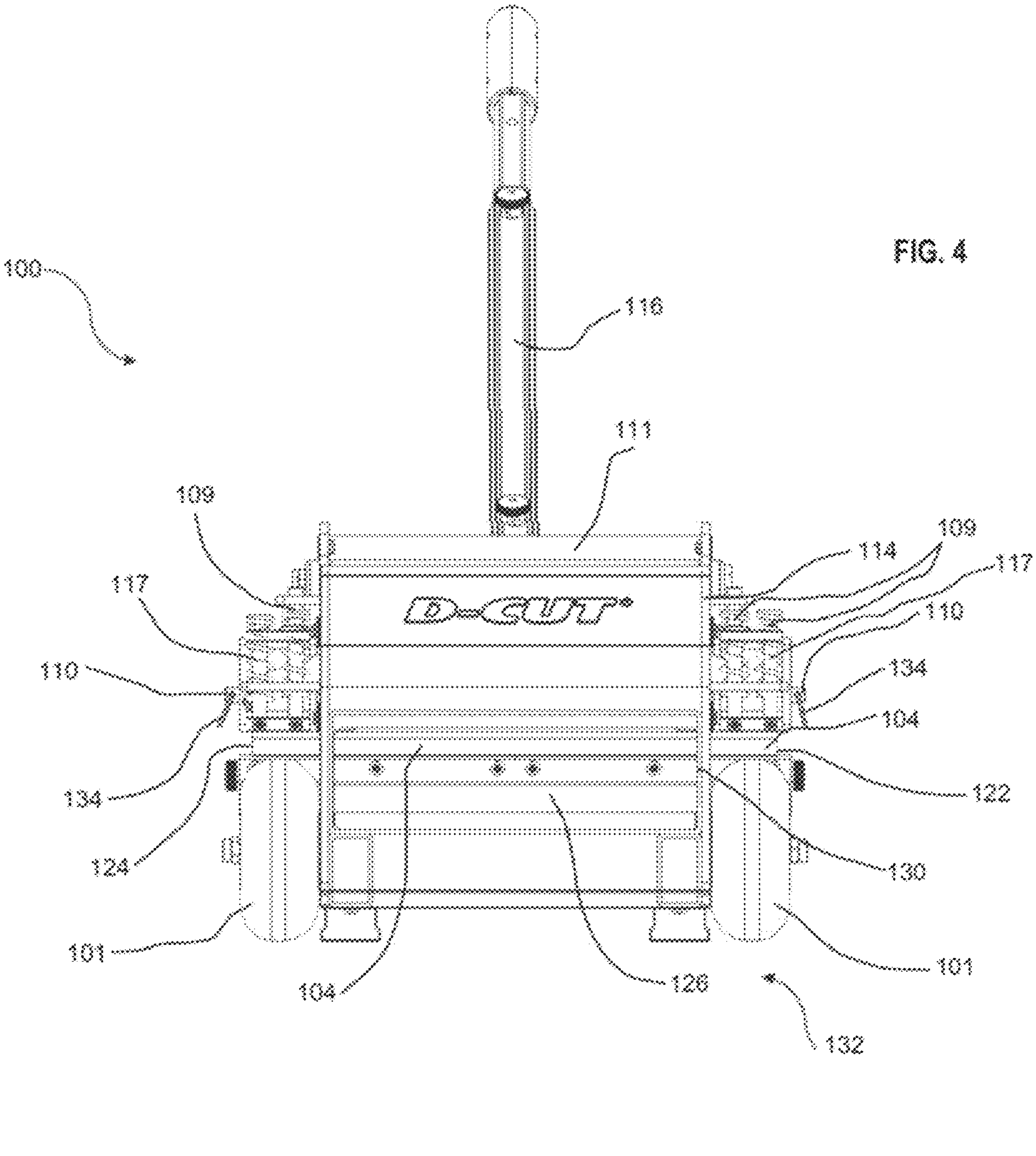
FIG. 4 shows a front view of the cutting tool according to the embodiment shown in FIG. 1.

To move the blade holder 110 and blade 112 to the desired position within the blade housing 108, at least one pull 134 is attached to an end the blade holder 110. As shown in FIG. 4, the blade holder 110 preferably includes two pulls 134, one at each end of the blade holder 110. The pulls 134 may include rings as shown, although other layouts may include notches, handles, or other hardware that may be attached (such as via welding) to the blade holder or added as a secondary component.

The cutting tool 100 can also include a battery-powered light 128 on the cutting platform 106. The light 128 aids the user to help make a more precise cut with additional visual cues from the light 128. The light is preferably mounted to a portion of the cutting platform 106, such as the blade housing 108 as shown, however the light may be placed at any number of positions where the user can more accurately view an imminent cut.

As best shown in FIG. 4, the supports 109 are connected to the cutting platform 106 by way of the housing column 114, extending generally perpendicular to a plane of the table surface 104. The supports 109 may be formed of materials such as steel or similar rigid material. In this embodiment, the supports 109 are bolts that each include a spring 117 wrapped around each bolt. The bolts are integrally threaded through a portion of the housing column 114 to support the cutting platform 106. The supports 109 are positioned on either side of the cutting platform 106 at a width sufficient to accommodate standard sizes of material, such as but not limited to floorboards or various building materials.

As shown in FIG. 2, the blade housing 108 is positioned in front of the supports 109 along the base 102 of the cutting tool 100. In other embodiments, the supports 109 can be welded to or connected with a mechanical connection, such as any additional threaded connections, to the cutting platform or connected in any other means known to one of skill in the art.

FIG. 4 shows a front view of the cutting tool 100 where the housing column 114 is observed on an end 132 of the base 102. The internal tube 126 is aligned with the table surface 104 should a piece of material need to be extended through the internal tube 126 to make a desired cut in the material. Any excess material length can protrude through a through-slot 130 arranged as a rectangular opening from the internal tube 126.

Figure 5:
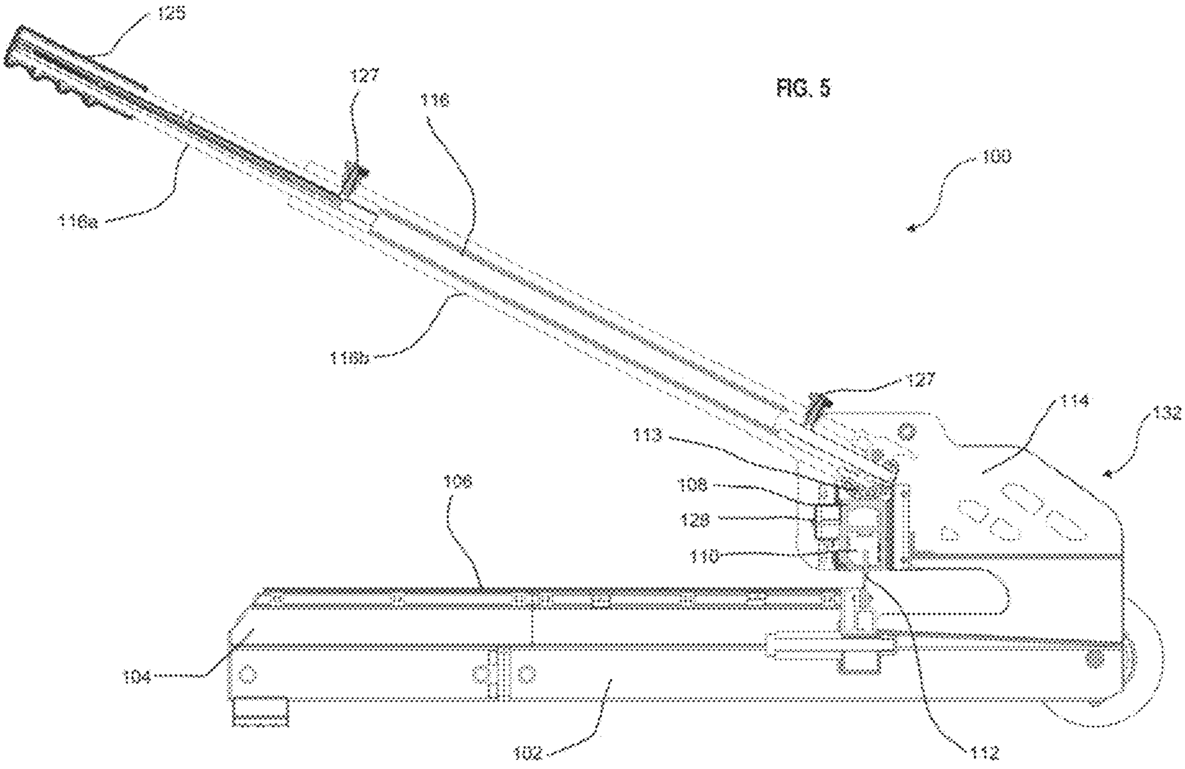
FIG. 5 shows a cross-sectional side view of the cutting tool according to the embodiment shown in FIG. 1.

FIG. 5 shows a cross-sectional view of the cutting tool 100. The handle 116 includes a hand grip 125 for the user to manually grab or engage the handle 116. The length of the handle 116 is adjustable for easy operation for the user, as well as for moving and storing the cutting tool 100. The handle 116 includes a handle insert **116*a* and a handle sleeve 116*b*. The handle insert 116*a* is connected to the hand grip 125. The handle sleeve 116*b* is connected to the beam 111. The insert 116*a* is slidable at various lengths inside the sleeve 116*b*. Releasable handle connectors 127 are positioned along the handle 116 to secure and release the handle 116 to adjust the length. The releasable handle connectors 127 are preferably threaded into a portion of the handle 116 where tightening of the connectors 127 puts pressure on the insert and sleeve 116*a*, 116*b* to lock the handle length in place, and wherein loosening of the connectors 127** releases the pressure so that the length of the handle may be modified. The length of the handle may be adjusted according to other known adjustment means as well.

Figure 6:
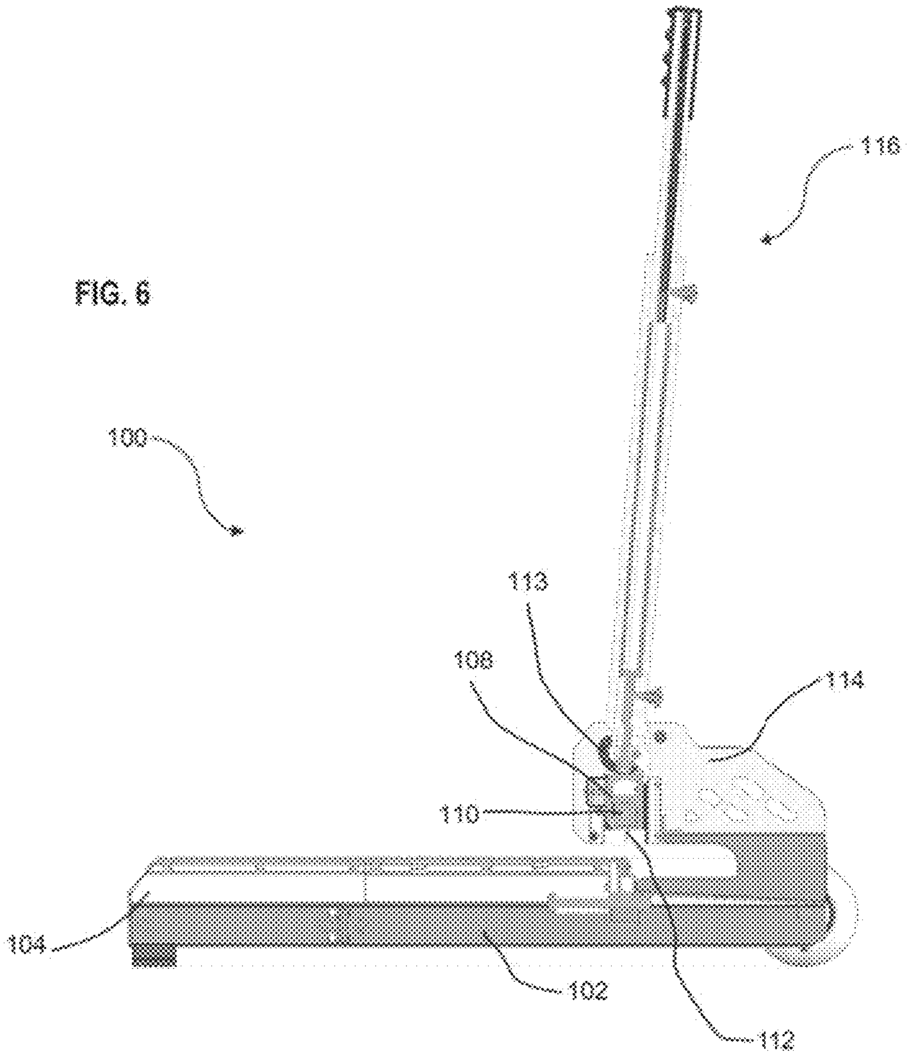
FIG. 6 shows a cross-sectional side view of the cutting tool, opposite the cross-sectional side view shown in FIG. 5, according to the embodiment shown in FIG. 1.

FIGS. 5 and 6 show the cams 113 connected to the beam 111. The blade housing 108 is positioned under and in contact with the cams 113. Each cam 113 rotates when the handle 116 moves. The cutting tool of this invention starts in an open position (FIG. 6). In the open position, the blade holder 110 and the blade 112 are upward where the cam 113 contacts the blade housing 108 at a relatively small radius, providing an opening between the blade 112 and the base 102. A piece of material to be cut is placed onto the table surface 104 and through the opening formed between the blade 112 and the cutting platform 106. To cut the material, the handle 116 is lowered to rotate the cam 113. By rotating the cam 113, a gradually increasing radius of an outer edge of the cam 113 pushes the blade housing 108 and blade 112 downward through the material until a large radius of the cam 113 contacts the blade housing 108 and the blade 112 contacts the blade stop 105 thereby severing the material. Increasing the radius of the cam forces the blade housing 108 downwards from the open position to a closed position (FIG. 5). The resulting cut is optimally free of splinters and a resulting cut end of the material is otherwise clean and straight.

Figure 7:
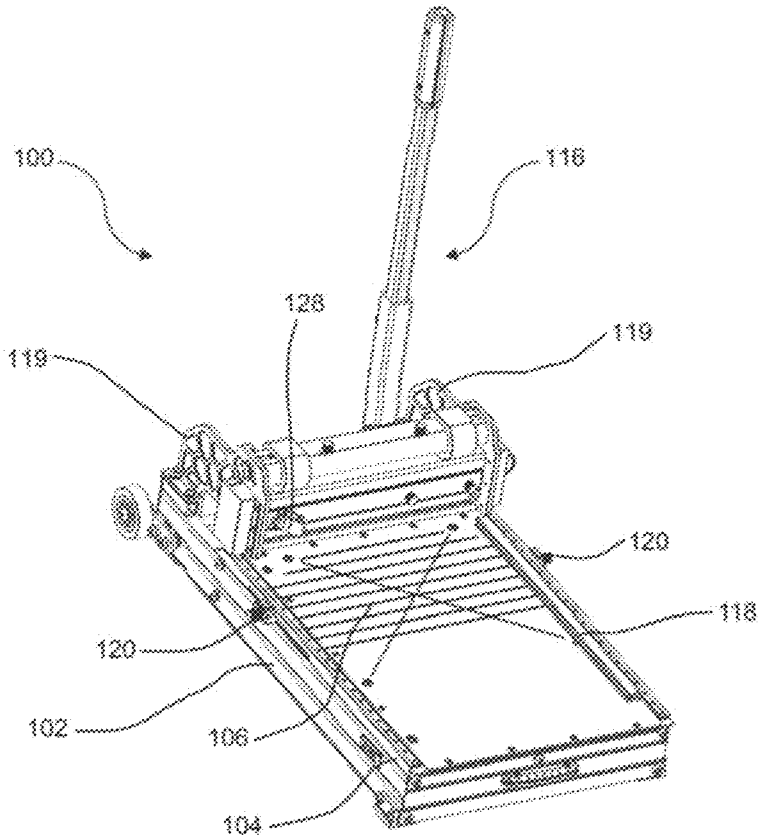
FIG. 7 shows a top perspective view of the cutting tool according to one embodiment of the invention.
Figure 8:
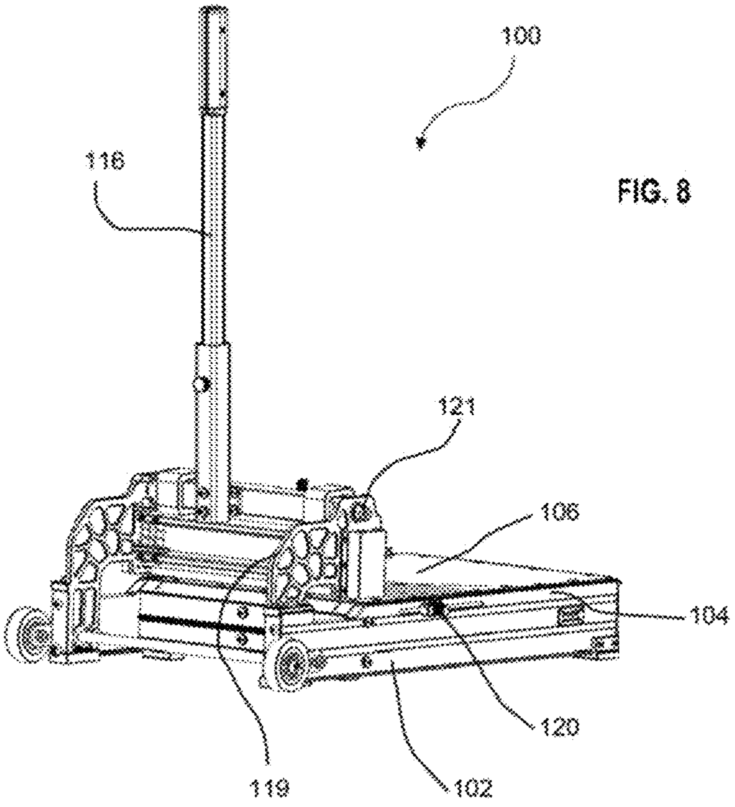
FIG. 8 shows a front perspective view of the cutting tool according to the embodiment shown in FIG. 7.
Figure 9:
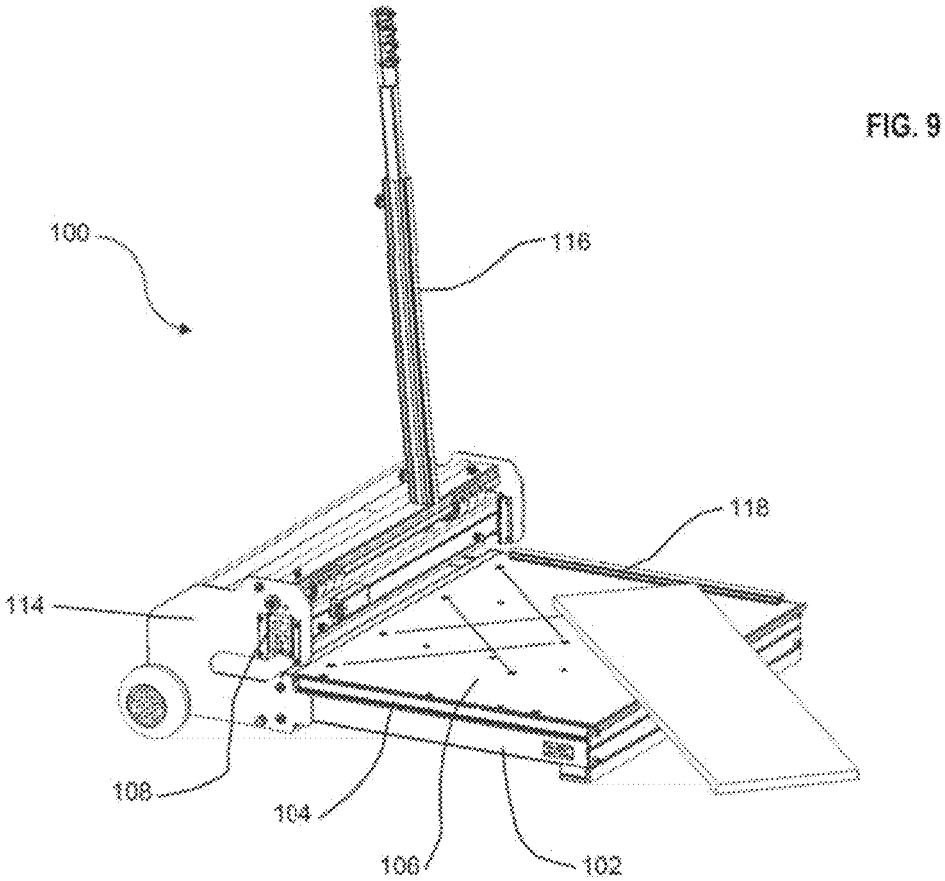
FIG. 9 shows a perspective view of the cutting tool according to one embodiment of the invention.

FIGS. 7 and 8 show perspective views of the cutting tool 100 according to one embodiment of the invention. Here, the cutting tool 100 includes a plate 119 rigidly connected to each edge of the cutting platform 106 mounted to the base 102. The plates 119 include bolts 121 for connecting with the beam 111. As the cams 113 rotate the beam 111 to move the handle 16, the bolts 121 rotate through the plates 119. The plates 119 are integrated with the base 102 so as to support the strength and pressure needed to maintain a cut in a piece of material when the handle is depressed from the open to the closed position. FIG. 9 shows a cutting tool according to another embodiment of the invention where the base, table surface and subsequent related components are visibly wider. The cutting tool 100 may be adjusted to any number of lengths and widths in accordance with customary sizes of desired materials to be cut.

Figure 10A:
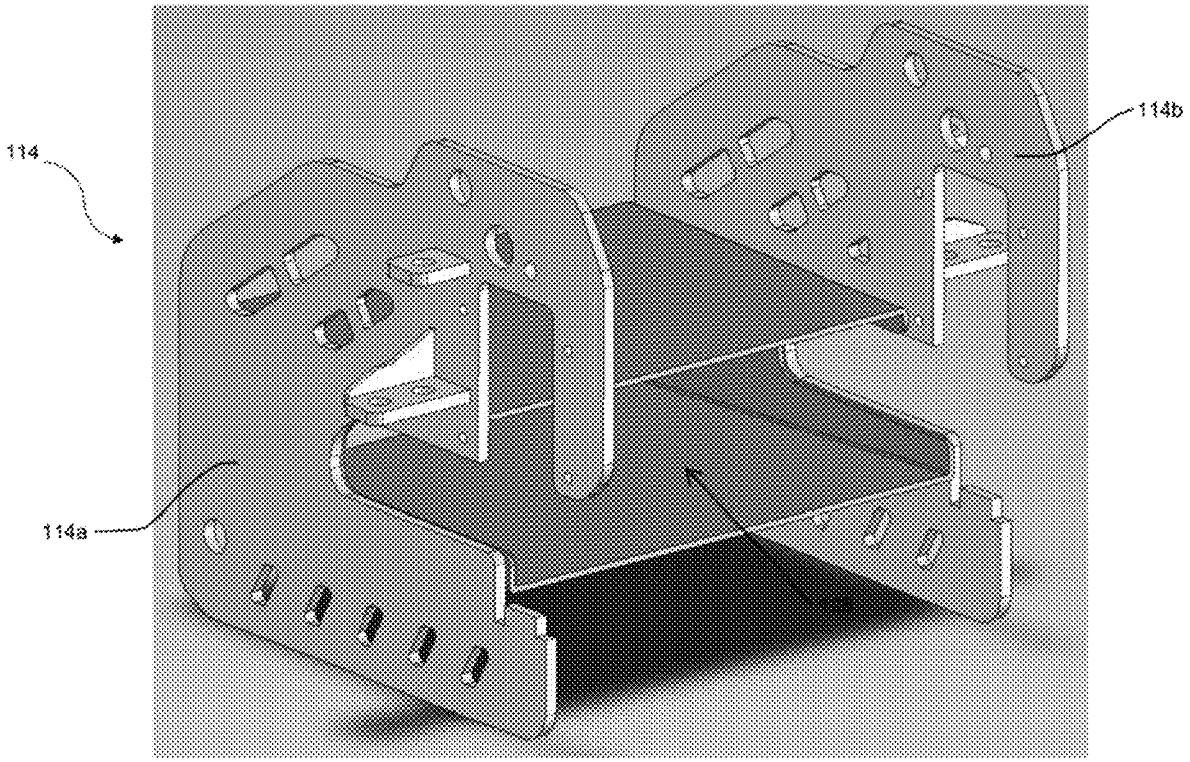
FIG. 10A shows a rear perspective view of a housing column of the cutting tool according to one embodiment of the invention.
Figure 10B:
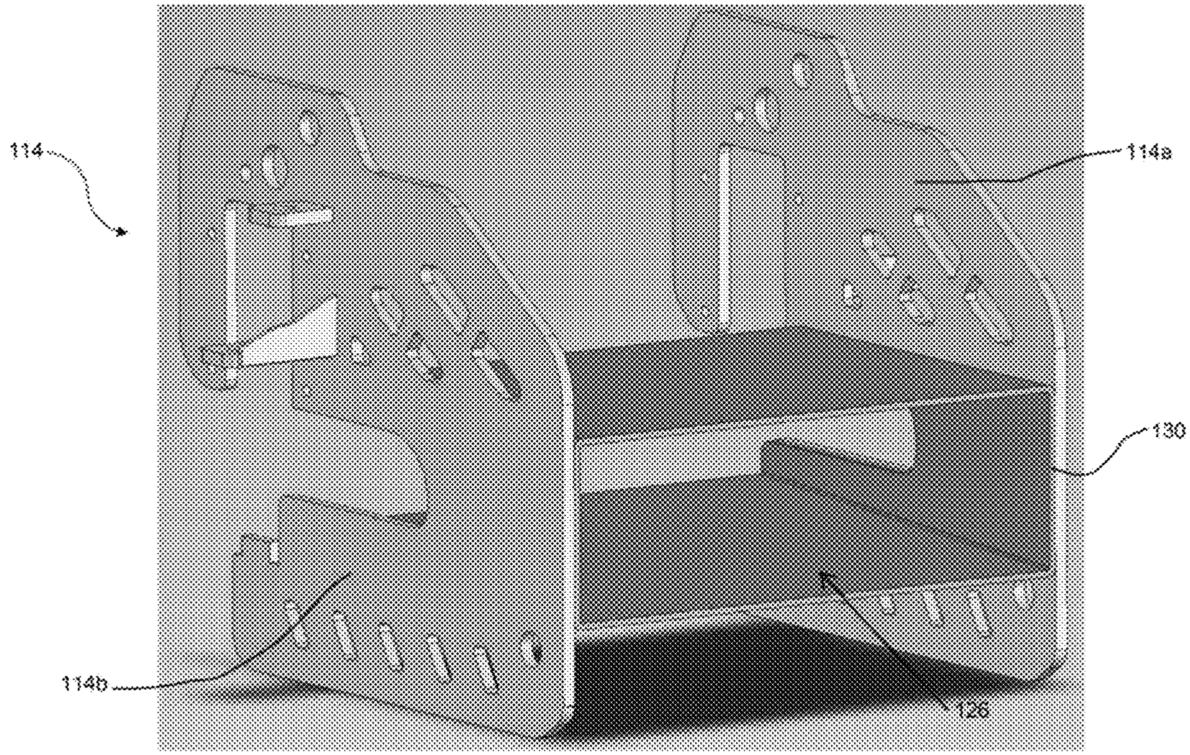
FIG. 10B shows a front perspective view of the housing column shown in FIG. 10A.

As shown best in FIGS. 10A-B, in order to support the pressure of the cutting platform 106 to make a cut, the housing column 114 is welded as a unitary piece. This unitary piece includes the pieces that form the rectangular internal tube 126, as well as two side pieces—a first side piece **114*a* and a second side piece 114*b*. The tube 126 is fully welded to the side pieces 114*a*, 114*b*. This improves the strength of the housing column 114 as the housing column 114 holds and supports the cutting platform 106. Specifically, having the housing column 114 as a single unitary piece, provides the support necessary for the cutting tool to make successful cuts on such a wide variety of materials of varying strengths and hardness. The cutting platform 106** is preferably manufactured of steel but may comprise any material or materials capable of withstanding the force required to push the blade through the building material.

In some embodiments of the invention, the blade is attached to the blade holder with a threaded connection. With this arrangement, the blade can be removed from the blade holder for repairs, sharpening and to select a specialty blade for any type of material. In an alternative embodiment, the blade can be integrally formed with the blade holder, where the blade holder is removable from the blade housing.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A cutting tool comprising:

a base having a table surface;

a cutting platform positioned above the table surface, the cutting platform including an associated blade housing, wherein the blade housing comprises a blade holder with a linear blade, wherein the blade holder is slidably connected through the blade housing;

a housing column mounted to the base of the cutting tool, the housing column including two side pieces and an integrated rectangular tube, wherein the cutting platform is integrated with a portion of the housing column;

a handle adapted to raise and lower the blade, wherein the handle is rotatably supported by the housing column; and a guide rail connected to the table surface by at least one releasable guide rail connector, wherein the guide rail is releasably positioned with respect to the blade at a plurality of angles, wherein the housing column supports the blade housing.

2. The cutting tool according to claim 1 wherein the linear blade and the blade holder are slidable within the blade housing in a horizontal direction past an edge of the base.

3. The cutting tool according to claim 1 wherein a length of the linear blade is greater than a width of the table surface.

4. The cutting tool according to claim 1 wherein a length of the linear blade is greater than a width of the base.

5. The cutting tool according to claim 1 wherein a length of the blade holder is greater than a width of the table surface.

6. The cutting tool according to claim 1 wherein a length of the blade holder is greater than a width of the base.

7. The cutting tool according to claim 1 wherein the linear blade comprises tungsten.

8. The cutting tool according to claim 1 wherein the housing column comprises an internal tube, a first side piece and a second side piece.

9. The cutting tool according to claim 8 wherein the internal tube is welded to the first side piece and the second side piece.

10. The cutting tool according to claim 1 wherein the cutting platform further comprises a battery-powered light connected with respect to the cutting platform.

11. The cutting tool according to claim 1 wherein the handle comprises an adjustable length.

12. The cutting tool according to claim 1 wherein the housing column comprises a through-slot at an end of the base.

13. The cutting tool according to claim 1 wherein the plurality of angles comprises 0°, 45°, and 90°.

14. A cutting tool comprising:

a base having a table surface;

a linear blade comprising a length that is greater than a width of the table surface;

a cutting platform positioned above the table surface, the cutting platform including an associated blade housing, wherein the blade housing comprises a blade holder with the linear blade, wherein the blade holder is slidably connected through the blade housing;

a unitary housing column mounted to the base of the cutting tool, wherein the unitary housing column is a singular welded component comprising an internal tube, a first side piece and a second side piece;

a handle adapted to raise and lower the blade, wherein the handle is rotatably supported by the housing column; and a guide rail pivotally connected to the table surface by at least one releasable guide rail connector, wherein the guide rail is releasably locked with respect to the base at a plurality of angles, wherein the housing column supports the blade housing.

15. The cutting tool according to claim 14 wherein the linear blade and blade holder are slidable within the blade housing in a horizontal direction past a first edge of the base.

16. The cutting tool according to claim 15 wherein the linear blade and blade holder are slidable within the blade housing in a horizontal direction past a second edge of the base.

17. The cutting tool according to claim 16 wherein the blade holder comprises a pull on at least one side of the blade holder, wherein the pull is configured to slide the blade holder to a selected horizontal position.

18. The cutting tool according to claim 14 wherein the linear blade comprises tungsten.

19. The cutting tool according to claim 14 wherein the housing column comprises a through-slot at an end of the base.

20. The cutting tool according to claim 14 wherein the plurality of angles comprises 0°, 45°, and 90°.

* * * * *